(12) United States Patent
Takahara et al.

(10) Patent No.: US 7,900,345 B2
(45) Date of Patent: Mar. 8, 2011

(54) INSULATION SLEEVE ASSEMBLING APPARATUS

(75) Inventors: Yoshihiro Takahara, Toyota (JP); Kiyoshi Iga, Nagoya (JP); Jin Hirai, Iwata (JP); Shinji Kominami, Nagoya (JP)

(73) Assignees: Toyota Jidosha Kabushiki Kaisha, Toyota-shi (JP); Tsubakimoto Kogyo Co., Ltd., Nagoya-shi (JP)

( * ) Notice: Subject to any disclaimer, the term of this patent is extended or adjusted under 35 U.S.C. 154(b) by 37 days.

(21) Appl. No.: 12/390,136

(22) Filed: Feb. 20, 2009

(65) Prior Publication Data
US 2009/0211084 A1   Aug. 27, 2009

(30) Foreign Application Priority Data
Feb. 22, 2008   (JP) ............... 2008-041268

(51) Int. Cl.
*B23P 19/00* (2006.01)
(52) U.S. Cl. .............. 29/745; 29/825; 57/7; 57/9; 74/502.5
(58) Field of Classification Search .......... 29/745, 29/825; 57/3, 9; 74/502.5
See application file for complete search history.

(56) References Cited

U.S. PATENT DOCUMENTS

| | | | | | |
|---|---|---|---|---|---|
| 3,214,995 | A | * | 11/1965 | Gilmore | 74/502.5 |
| 3,381,363 | A | * | 5/1968 | Gilmore | 29/434 |
| 3,707,170 | A | * | 12/1972 | Mazuir et al. | 138/154 |
| 3,717,987 | A | * | 2/1973 | Gilmore et al. | 57/9 |
| 4,012,894 | A | * | 3/1977 | Akachi et al. | 57/293 |
| 6,225,556 | B1 | * | 5/2001 | Saito | 174/36 |

FOREIGN PATENT DOCUMENTS

| | | |
|---|---|---|
| JP | 2000-247540 A | 9/2000 |
| JP | 2001-357766 A | 12/2001 |
| JP | 2002-250337 A | 9/2002 |
| JP | 2005-184975 A | 7/2005 |
| JP | 2007-097300 A | 4/2007 |

* cited by examiner

*Primary Examiner*—C. J Arbes
(74) *Attorney, Agent, or Firm*—Kenyon & Kenyon LLP

(57) ABSTRACT

An insulation sleeve assembling apparatus that assembles a tubular insulation sleeve to a lead wire that is formed of a plurality of conductors includes an actuator unit that rotates the insulation sleeve while actuating the lead wire and the insulation sleeve in a direction in which the lead wire and the insulation sleeve approach each other.

7 Claims, 7 Drawing Sheets

INSULATION SLEEVE ASSEMBLING APPARATUS

INCORPORATION BY REFERENCE

The disclosure of Japanese Patent Application No. 2008-041268 filed on Feb. 22, 2008 including the specification, drawings and abstract is incorporated herein by reference in its entirety.

BACKGROUND OF THE INVENTION

1. Field of the Invention

The invention relates to an insulation sleeve assembling apparatus and insulation sleeve assembling method that assembles a tubular insulation sleeve to a lead wire formed of a plurality of conductors.

2. Description of the Related Art

There is a process in which an insulation sleeve is assembled to a lead wire formed of a plurality of conductors extending outward from a stator of a motor. In this case, in a process previous to the above process, the plurality of conductors are tied together by tape so that the plurality of conductors that constitute the lead wire do not come apart. Japanese Patent Application Publication No. 2007-97300 (JP-A-2007-97300) describes that a plurality of conductors that constitute a lead wire are sequentially put together by a machine to align the distal ends of the conductors and then inserted into an insertion hole of a tubular insulation sleeve while the insertion hole is being guided. However, in the invention described in JP-A-2007-97300, in the process previous to a process of manufacturing a stator, the plurality of conductors of the lead wire are temporarily tied with tape to prevent the conductors from coming apart. In order to prevent the temporarily tied tape from peeling off, the temporarily tied tape has extended portions extending from a portion that is wound around the conductors, and then the extended portions are bonded with each other. According to the method described in JP-A-2007-97300, when the lead wire is inserted into the insulation sleeve, the tape, particularly, the extended portions of the tape, interfere with the insertion and, therefore, the insulation sleeve cannot be inserted or insertion of the insulation sleeve takes time. Thus, in order to remove the tape after the distal end of the lead wire is inserted in the insulation sleeve, it is necessary to peel the tape that ties the lead wire, thus requiring an unnecessary work. In addition, to avoid the unnecessary work, it is conceivable that the tape is initially peeled from the conductors, and the distal end of the lead wire is inserted beforehand in an insertion tube that is different from the insulation tube in order to prevent the conductors from coming apart. However, this method requires additional work and time for inserting the conductors into the insertion tube and, therefore, productivity deteriorates.

SUMMARY OF THE INVENTION

The invention provides an insulation sleeve assembling apparatus and insulation sleeve assembling method that are able to assemble an insulation sleeve to a lead wire without peeling a tape that temporarily ties the lead wire in a bundle from the lead wire in the previous process.

A first aspect of the invention provides an insulation sleeve assembling apparatus that assembles a tubular insulation sleeve to a lead wire formed of a plurality of conductors. The insulation sleeve assembling apparatus includes an actuator unit that rotates the insulation sleeve while actuates the lead wire and the insulation sleeve in a direction to approach each other.

In addition, a second aspect of the invention provides an insulation sleeve assembling method that assembles a tubular insulation sleeve to a lead wire formed of a plurality of conductors. The insulation sleeve assembling method includes rotating the insulation sleeve while driving the lead wire and the insulation sleeve in a direction to approach each other by a pair of center-recessed-cylinder-shaped rotors that are arranged so as to obliquely intersect with each other.

The insulation sleeve assembling apparatus according to the first aspect is supplied with the lead wire formed of the plurality of conductors that are temporarily tied with tape. The insulation sleeve assembling apparatus according to the first aspect includes the actuator unit that rotates the insulation sleeve while actuating the lead wire and the insulation sleeve in a direction to approach each other. Thus, the tape wound around the lead wire is involved in the insulation sleeve to thereby make it possible to insert the lead wire into the insulation sleeve together with the tape. Hence, a process of peeling the tape may be eliminated.

In the above aspect, the actuator unit is the pair of center-recessed-cylinder-shaped rotors that are arranged so as to obliquely intersect with each other. Thus, when the insulation sleeve is placed at a position at which the center-recessed-cylinder-shaped recessed portions intersect with each other, it is possible to apply both rotational force and advancing force to the insulation sleeve at the same time. Here, the insulation sleeve is made of woven fiber coated with resin in order to ensure electrical insulation even when the insulation sleeve is rubbed. Thus, the insulation sleeve has a certain rigidity. Hence, when the insulation sleeve is inserted in between the center-recessed-cylinder-shaped recessed portions of the pair of center-recessed-cylinder-shaped rotors, the outer peripheral surface of the insulation sleeve closely contacts the outer peripheral surfaces of the rotors and, therefore, the insulation sleeve can receive the force applied from the rotors. Then, the insulation sleeve rotates with a hollow shape while approaching the lead wire. Thus, the extended portion of the tape wound around the lead wire is involved with the rotating peripheral surface of the insulation sleeve and then inserted into the hollow portion of the insulation sleeve.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
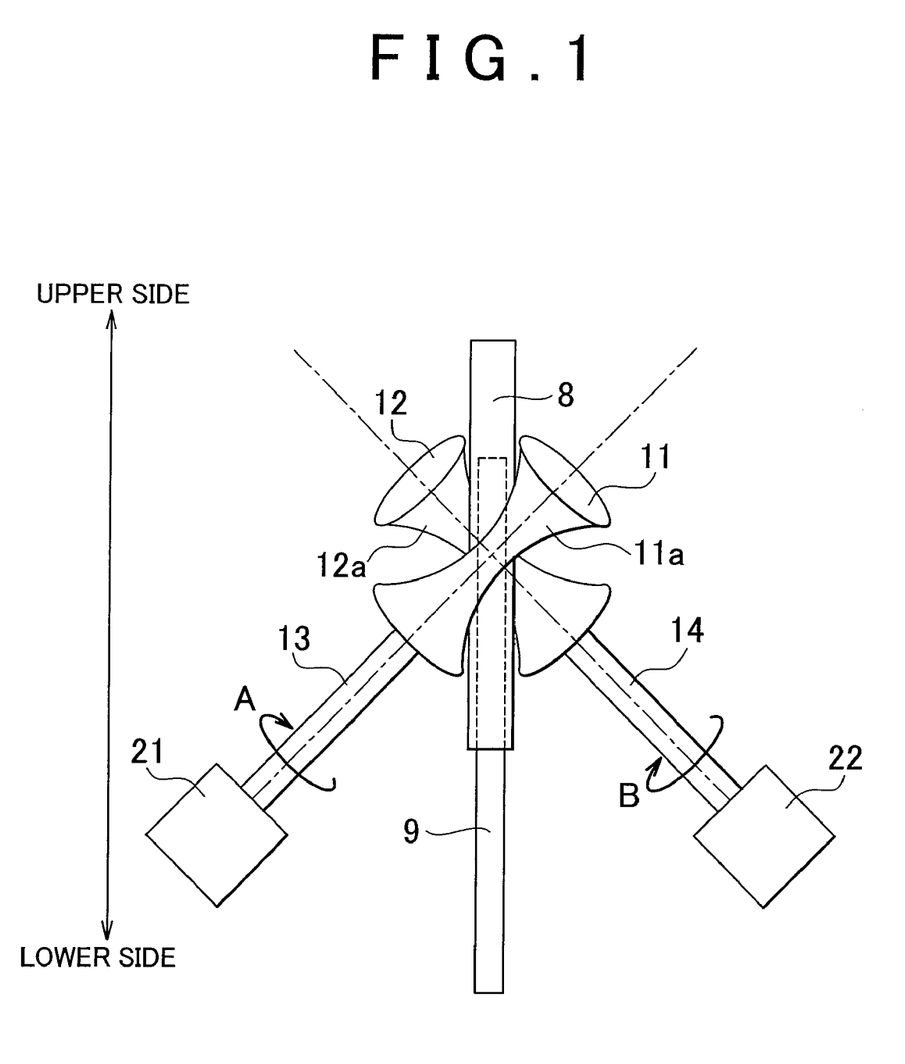
FIG. 1 is a schematic view that shows the configuration of an apparatus used in an insulation sleeve assembling method according to an embodiment of the invention.

Hereinafter, an insulation sleeve assembling apparatus and an insulation sleeve assembling method according to an embodiment of the invention will be described in greater detail with reference to the accompanying drawings. FIG. 1 shows a conceptual view of the insulation sleeve assembling apparatus according to the embodiment of the invention. A pair of center-recessed-cylinder-shaped first rotor 11 and second rotor 12 each have a recessed portion such that a cylinder is constricted in the longitudinally middle. The pair of first rotor 11 and second rotor 12 are arranged so as to intersect at right angles with each other at an intersection of the middle of the recessed portion 11a and the middle of the recessed portion 12a. The first rotor 11 is connected to a first rotary motor 21 via a first rotary shaft 13. The second rotor 12 is connected to a second rotary motor 22 via a second rotary shaft 14. An insulation sleeve chucking device (not shown) is provided above the position at which the first rotor 11 intersects with the second rotor 12, and holds an insulation sleeve 8 at a predetermined position. The insulation sleeve 8 is supplied from above. In addition, a lead wire guide (not shown) is provided below the position at which the first rotor 11 intersects with the second rotor 12, and holds a lead wire 9 at a predetermined position. The lead wire 9 is supplied from below.

Figure 2:
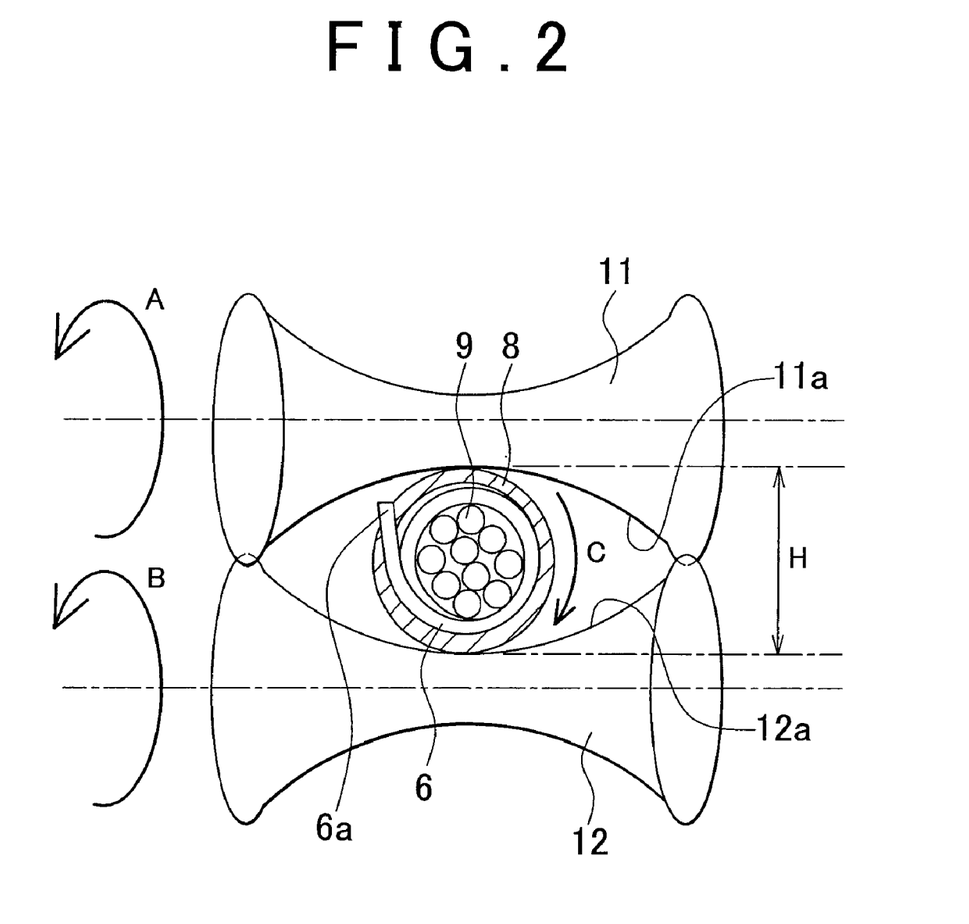
FIG. 2 is a view that shows the operation of a relevant portion of FIG. 1.

The positional relationship between the first rotor 11 and the second rotor 12 is shown in FIG. 2. The middle of the recessed portion 11a of the first rotor 11 and the middle of the recessed portion 12a of the second rotor 12 are spaced at a predetermined distance H shown in the drawing, and the first rotor 11 and the second rotor 12 are skew with respect to each other. Here, the predetermined distance H is slightly longer than the outer diameter of the insulation sleeve 8 (indicated by hatching in FIG. 2). The insulation sleeve 8 has a hollow tubular shape, and is made of woven fiber coated with resin in order to constantly ensure high electrical insulation by preventing occurrence of a cut line, or the like, even when the outer periphery of the insulation sleeve 8 is rubbed a little. Thus, the insulation sleeve 8 has a certain rigidity. That is, the insulation sleeve 8 has a repulsive force by which the insulation sleeve holds the original shape even when force is applied to the outside shape of the insulation sleeve 8. The distal end of the lead wire 9 formed of a plurality of conductors is inserted in the distal end of the insulation sleeve 8. Here, because the plurality of conductors of the lead wire 9 are tied with two lengths of tape 6 and 7 near the distal end thereof, the distal end of the lead wire 9 may be easily inserted into the insulation sleeve 8 (see FIG. 3). When the insulation sleeve 8 is inserted in a space formed between the recessed portion 11a of the first rotor 11 and the recessed portion 12a of the second rotor 12, the outer peripheral surface of the insulation sleeve 8 closely contacts the outer peripheral surface of the recessed portion 11a of the first rotor 11 and the outer peripheral surface of the recessed portion 12a of the second rotor 12. This allows the insulation sleeve 8 to receive the rotational force of the first rotor 11 and second rotor 12.

Figure 3:
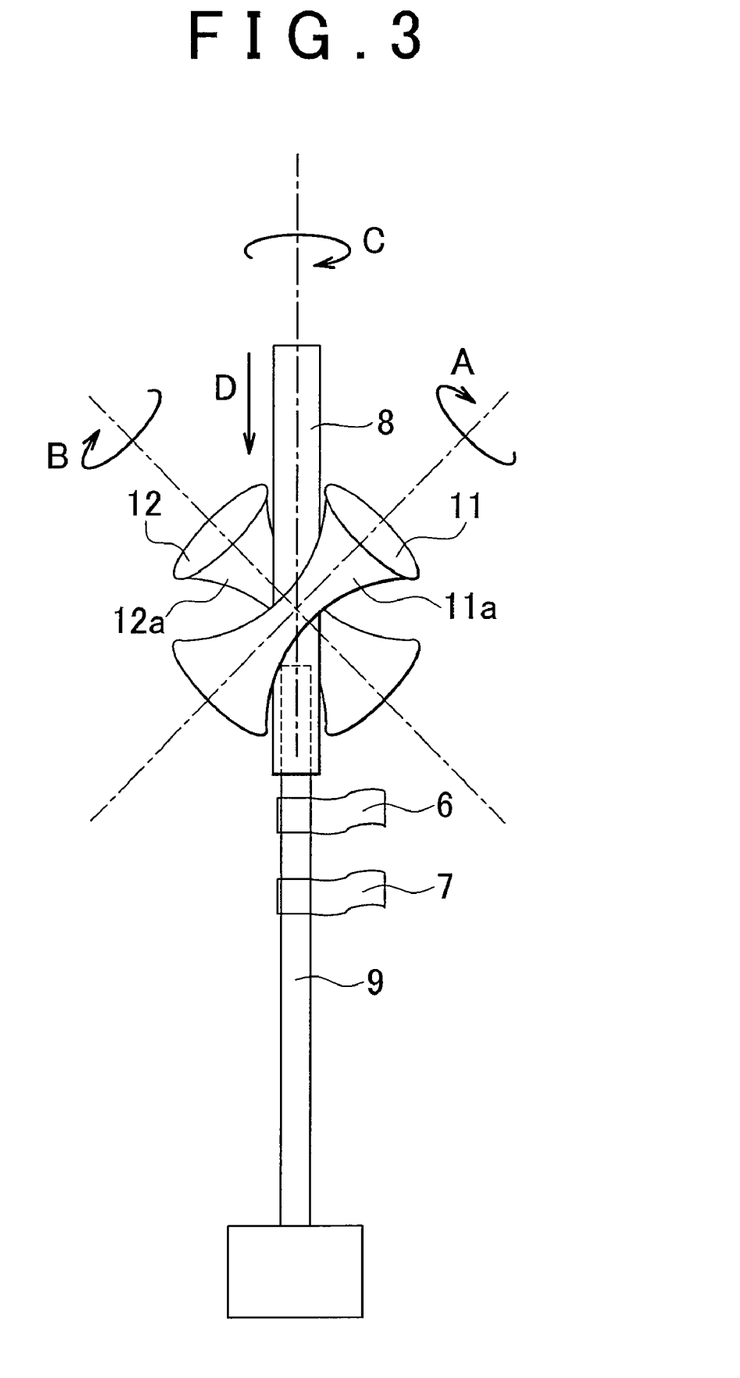
FIG. 3 is a view that shows the operation of FIG. 1.

As shown in FIG. 1, the first rotor 11 rotates in a counterclockwise direction (indicated by the arrow A in the drawing) as viewed from the first rotary motor 21 side. The second rotor 12 rotates similarly in a counterclockwise direction (indicated by the arrow B in the drawing) as viewed from the second rotary motor 22 side. That is, the first rotary motor 21 and the second rotary motor 22 rotate in the same direction. As shown in FIG. 2 and FIG. 3, as the first rotor 11 rotates in the arrow A direction and the second rotor 12 rotates in the arrow B direction, the insulation sleeve 8 rotates in the direction indicated by the arrow C. That is, the insulation sleeve 8 is rotated in a counterclockwise direction as viewed from a side opposite to the side from which the lead wire 9 is inserted. In FIG. 2, as the first rotor 11 rotates in the arrow A direction, the insulation sleeve 8 receives rotational force in the arrow C direction. In addition, as the second rotor 12 rotates in the arrow B direction, the insulation sleeve 8 receives rotational force in the arrow C direction. Because the insulation sleeve 8 receives rotational force in the arrow C direction from both the first rotor 11 and the second rotor 12, the insulation sleeve 8 rotates in the arrow C direction. Here, the first rotor 11 and the second rotor 12 respectively apply rotational force at opposite outer peripheral positions (positions different in 180 degrees from each other) to the insulation sleeve 8. Thus, the insulation sleeve 8 may be stably rotated while maintaining the outer peripheral shape.

At the same time, the first rotor 11 and the second rotor 12 each apply force to the insulation sleeve 8 to feed the insulation sleeve 8 in the direction indicated by the arrow D in FIG. 3. Thus, the insulation sleeve 8 is fed in the arrow D direction while being rotated in the arrow C direction. As shown in FIG. 3, two lengths of tape 6 and 7 are wound around the lead wire 9 in order to tie the conductors. The insulation sleeve 8 is fed in the arrow D direction while being rotated in the arrow C direction with respect to the lead wire 9 that is held at a predetermined position. Thus, the insulation sleeve 8 moves outside the lead wire 9 and, as a result, inserts the lead wire 9 thereinto. In process of inserting the lead wire 9 into the insulation sleeve 8, as shown in FIG. 2, because the insulation sleeve 8 is rotated in the arrow C direction, an outward extended portion 6a of the tape 6 is sequentially involved in between the lead wire 9 and the insulation sleeve 8 and then accommodated inside the insulation sleeve 8 so that the extended portion 6a is wound around the lead wire 9. For the tape 7 as well, as in the case of the tape 6, the outward extended portion of the tape 7 is accommodated inside the insulation sleeve 8.

Figure 4:
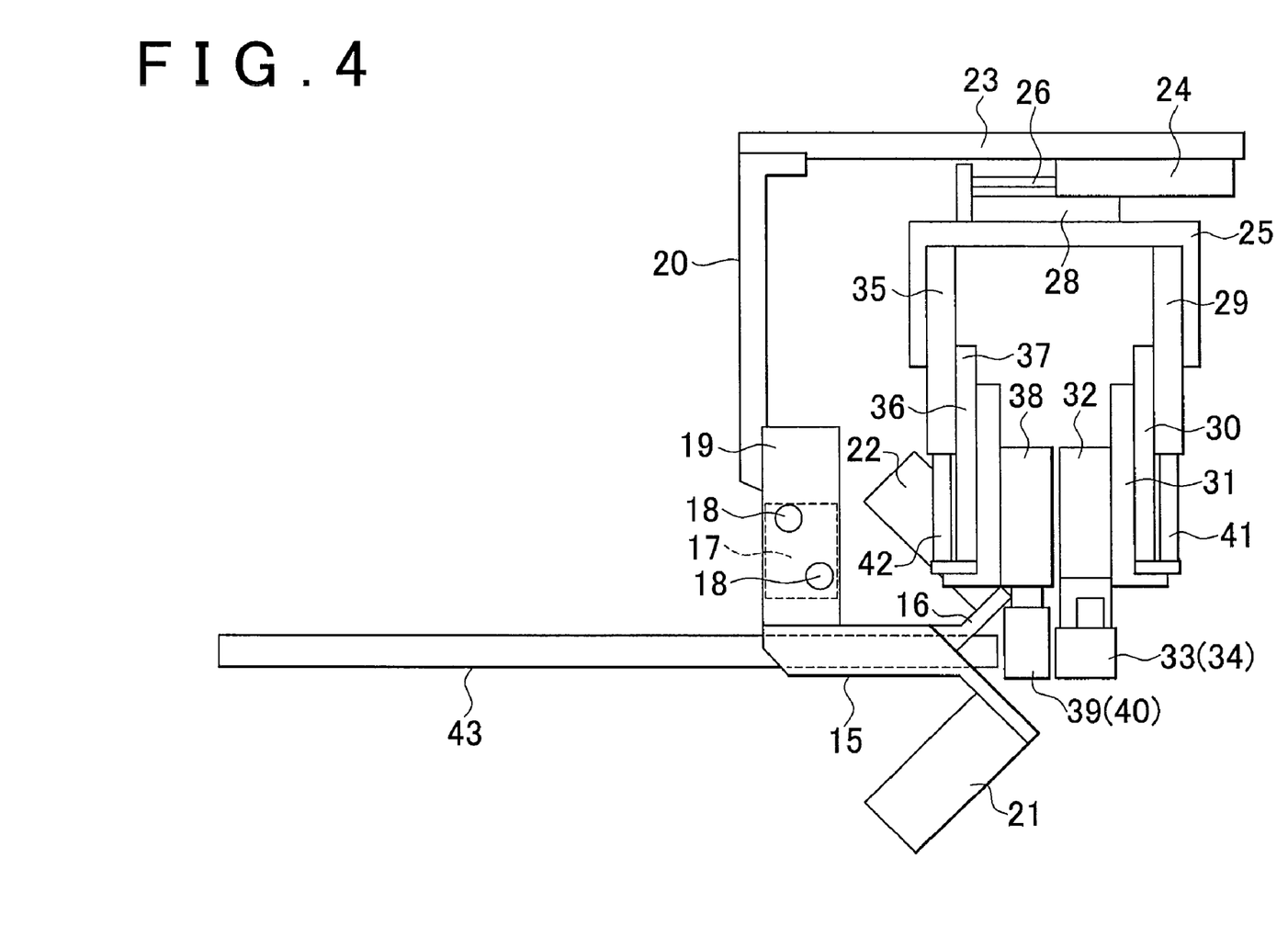
FIG. 4 is a plan view that shows the overall configuration of an insulation sleeve assembling apparatus according to the embodiment of the invention.
Figure 5:
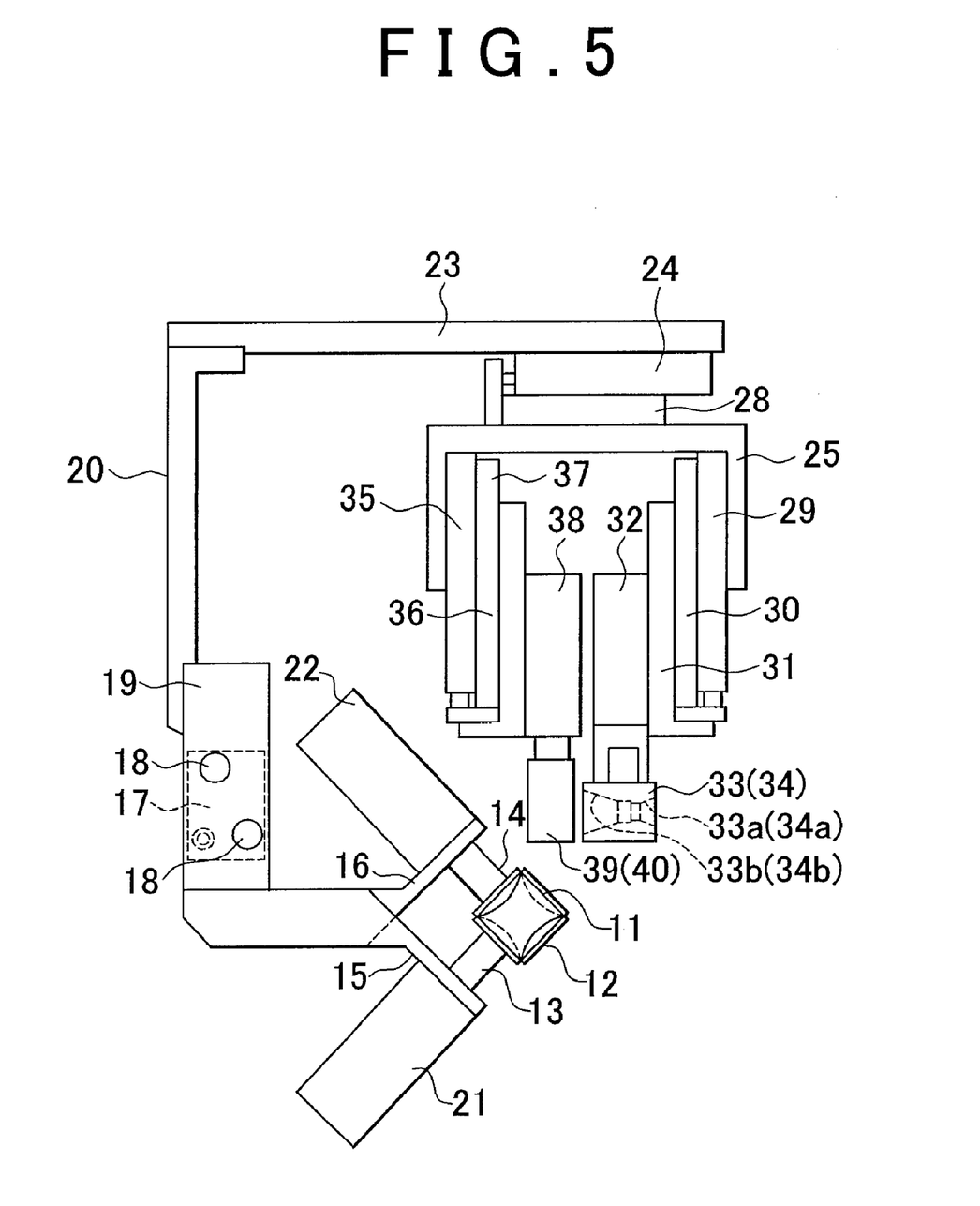
FIG. 5 is a plan view that shows the overall configuration of the insulation sleeve assembling apparatus according to the embodiment of the invention, and is a plan view that shows an operating state different from that of FIG. 4.
Figure 6:
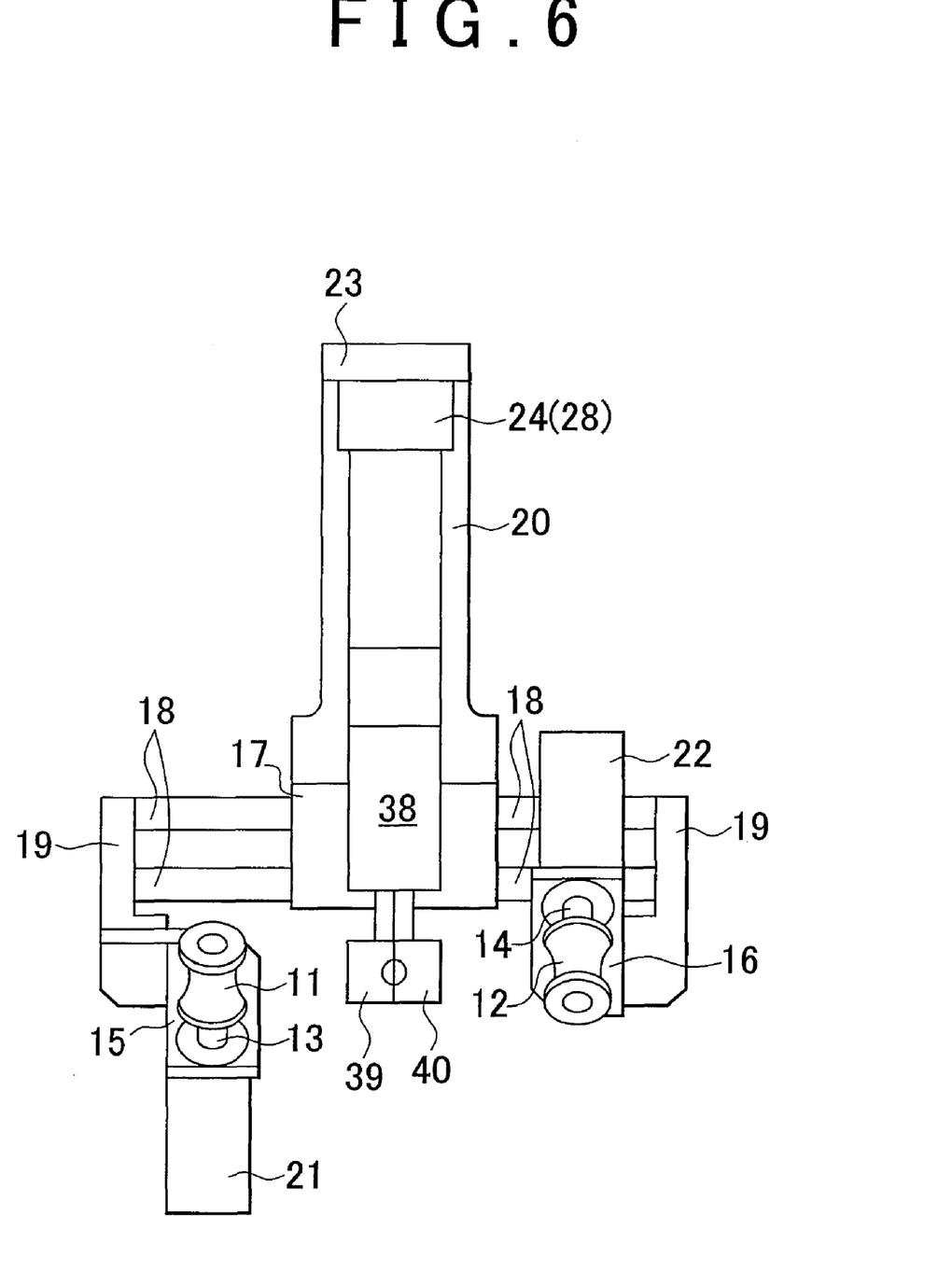
FIG. 6 is a right side view of a main portion of FIG. 4.

Next, a specific apparatus for implementing the apparatus that is conceptually shown in FIG. 1 to FIG. 3 will be described. FIG. 4 and FIG. 5 show plan views of the apparatus overall. FIG. 4 shows a process in which the distal end of the lead wire 9 is inserted into the insulation sleeve 8. FIG. 5 shows a process in which, in a state where the distal end of the lead wire 9 is inserted in the insulation sleeve 8, the lead wire 9, including the two lengths of tape 6 and 7, is inserted into the insulation sleeve 8. FIG. 6 shows a right side view of FIG. 4. In FIG. 4, in order to make it easy to see other components, the first rotor 11 and the second rotor 12 are omitted. As shown in FIG. 6, the first rotor 11 is spaced apart from the second rotor 12, and the first rotor 11 and the second rotor 12 are not operating in this process.

A sliding device 24 includes an air cylinder and a linear slide unit, and is provided on a body base 23. The sliding device 24 slidably holds an insertion jig movable member 28. The insertion jig movable member 28 is moved horizontally in FIG. 4 by extending or contracting a rod 26 of the air cylinder. An insertion jig base 25 is provided on the insertion jig movable member 28. As shown in FIG. 4, the insertion jig base 25 is formed so that both ends project in the same direction. A lead wire guide actuator 29 is provided on one of the projected plates. An insulation sleeve actuator 35 is provided on the other one of the projected plates.

The lead wire guide actuator 29 is a sliding device that includes an air cylinder and a linear slide unit. The lead wire guide actuator 29 slidably holds a lead wire guide movable member 30. The lead wire guide movable member 30 is moved vertically in FIG. 4 or FIG. 5 by extending or contracting a rod 41 of the air cylinder. A lead wire chucking device 32 is provided for the lead wire guide movable member 30 through a lead wire bracket 31. The lead wire chucking device 32 is actuated by the air cylinder, and lead wire guides 33 and 34 are respectively mounted on a pair of chucks of the lead wire chucking device 32 so that the lead wire guides 33 and 34 may contact with or move away from each other. As shown by the dotted line in FIG. 5, in a state where the lead wire guides 33 and 34 are in contact with each other, guide portions 33a and 34a are formed at the right end portions of the lead wire guides 33 and 34 in FIG. 5 for positioning the distal end of the lead wire 9. In addition, guide portions 33b and 34b are formed at the left end portions of the lead wire guides 33 and 34 in FIG. 5 for positioning the distal end of the insulation sleeve 8. The lead wire 9 positioned by the guide portions 33a and 34a is inserted into the insulation sleeve that is positioned by the guide portions 33b and 34b.

The insulation sleeve actuator 35 is a sliding device that includes an air cylinder and a linear slide unit. The insulation sleeve actuator 35 slidably holds an insulation sleeve movable member 36. The insulation sleeve movable member 36 is moved vertically in FIG. 4 or FIG. 5 by extending or contracting a rod 42 of the air cylinder. An insulation sleeve chucking device 38 is provided for the insulation sleeve movable member 36 through an insulation sleeve bracket 37. The insulation sleeve chucking device 38 is actuated by the air cylinder, and insulation sleeve chucks 39 and 40 are respectively mounted on a pair of chucks of the insulation sleeve chucking device 38 so that the insulation sleeve chucks 39 and 40 may contact with or move away from each other. When the insulation sleeve chucks 39 and 40 are in contact with each other, the insulation sleeve chucks 39 and 40 hold the outer periphery of the insulation sleeve 8 so that the insulation sleeve 8 does not slide back even when the lead wire 9 is inserted.

Figure 7:
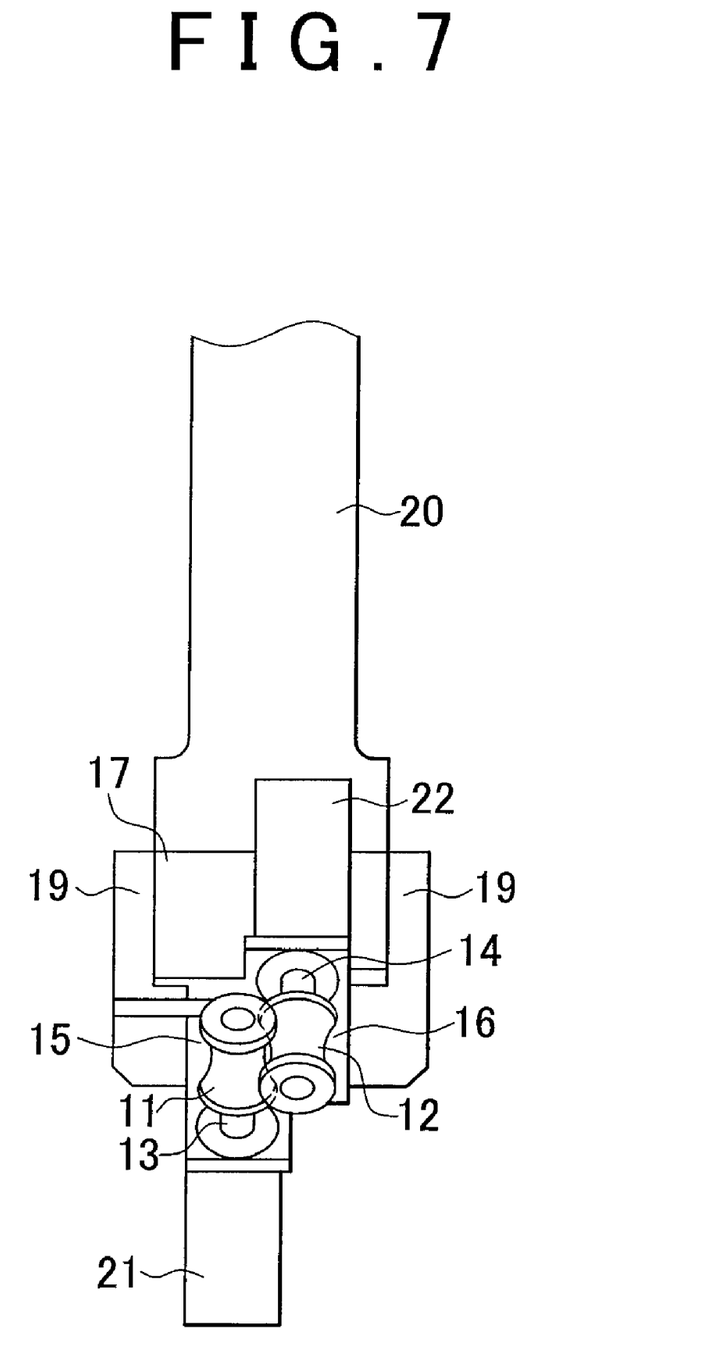
FIG. 7 is a right side view of a main portion of FIG. 5.

As shown in FIG. 4 and FIG. 5, a rotor movable base 20 extends upright from the left end of the body base 23. As shown in FIG. 6, a rotor actuator 17 is provided on the rotor movable base 20. The rotor actuator 17 incorporates an air cylinder, and is pneumatically actuated to extend or contract two guide rods 18 horizontally in FIG. 6. Rotor moving members 19 are respectively provided at the distal ends of the two guide rods 18. A first rotor bracket 15 is attached to the left side rotor movable member 19 in FIG. 6. In addition, a second rotor bracket 16 is attached to the right side rotor movable member 19 in FIG. 6. The first rotary motor 21 is provided on the first rotor bracket 15. The first rotor 11 is fixedly connected to the first rotary shaft 13, which is an output shaft of the first rotary motor 21. The second rotary motor 22 is provided on the second rotor bracket 16. The second rotor 12 is fixedly connected to the second rotary shaft 14, which is an output shaft of the second rotary motor 22. An insulation sleeve feeding pipe 43 shown in FIG. 4 is provided using a mounting member (not shown) in correspondence with the center of the insulation sleeve chucks 39 and 40 shown in FIG. 6. The first rotor 11 and the second rotor 12 are movable between a remote position shown in FIG. 6 and a near position shown in FIG. 7. In the near position shown in FIG. 7, the first rotor 11 and the second rotor 12 are positioned as shown in FIG. 2.

Next, the operation of the apparatus shown in FIG. 4 to FIG. 7 will be described. In a first process, the apparatus is placed in a state shown in FIG. 4 and FIG. 6. As shown in FIG. 6, the air cylinder of the rotor actuator 17 is actuated, and the guide rods 18 are extended. Thus, the pair of rotor movable members 19 are spaced apart from each other. By so doing, the first rotor bracket 15 and the second rotor bracket 16 are also spaced apart from each other, and the first rotor 11 and the second rotor 12 are spaced apart from each other and are not located near an outlet of the insulation sleeve feeding pipe 43. On the other hand, the air cylinders of the sliding device 24, lead wire guide actuator 29 and insulation sleeve actuator 35 are actuated, and the lead wire guides 33 and 34 are located at the position shown in FIG. 4. At this time, the lead wire chucking device 32 is also actuated, and the lead wire guides 33 and 34 are closed. The air cylinder of the insulation sleeve chucking device 38 is not actuated, and the insulation sleeve chucks 39 and 40 are open.

In this state, the insulation sleeve 8 having a predetermined length is placed in the insulation sleeve feeding pipe 43. The insulation sleeve 8 is fed out from the distal end of the insulation sleeve feeding pipe 43 by a feeding device (not shown) and is positioned by the guide portions 33b and 34b, which are respectively formed in the lead wire guides 33 and 34. In this state, the insulation sleeve chucking device 38 is actuated to close the insulation sleeve chucks 39 and 40 to chuck the insulation sleeve 8. At this time, the outer periphery of the insulation sleeve 8 is lightly chucked so that the hollow portion of the insulation sleeve 8 is not crushed. Next, as shown in FIG. 3, the lead wire 9, which is formed of the plurality of conductors that are tied with two lengths of tape 6 and 7, is fed from the guide portions 33a and 34a of the lead wire guides 33 and 34 by a feeding device (not shown). The distal end of the lead wire 9 is guided to the guide portions 33a and 34a and is inserted into the hollow portion of the insulation sleeve 8. At this time, the insulation sleeve 8 is chucked by the insulation sleeve chucks 39 and 40, so the insulation sleeve 8 does not slide back. As shown in FIG. 3, the distal end of the lead wire 9 is inserted to a position that is a little bit farther from the position at which the first rotor 11 intersects with the second rotor 12. Thus, the lead wire 9 is inserted into the insulation sleeve 8 at the position at which the first rotor 11 intersects with the second rotor 12.

Next, the air cylinder of the insulation sleeve chucking device 38 is stopped, and the insulation sleeve chucks 39 and 40 move away from the insulation sleeve 8. In addition, the air cylinder of the lead wire chucking device 32 is also stopped, and the lead wire guides 33 and 34 move away from the lead wire 9. Next, the air cylinders of the lead wire guide actuator 29, insulation sleeve actuator 35 and sliding device 24 are stopped to contract the rods 41, 42 and 26. Thus, the rods 41, 42 and 26 are placed in a state shown in FIG. 5. Next, the air cylinder of the rotor actuator 17 is stopped to contract the guide rods 18. Thus, the first rotor 11 and the second rotor 12 are placed in a state shown in FIG. 7. At this time, as shown in FIG. 2, the first rotor 11 and the second rotor 12 slightly press the insulation sleeve 8 from above and below at a position to which the lead wire 9 is inserted.

Next, as shown in FIG. 3, the first rotor 11 is rotated in a clockwise direction (arrow A direction) as viewed from the outside. At the same time, the second rotor 12 is rotated in a clockwise direction (arrow B direction) as viewed from the outside. The first rotor 11 and the second rotor 12 are controlled so as to rotate at the same speed. When the first rotor 11 and the second rotor 12 both are rotated in the clockwise direction, the insulation sleeve 8 is rotated in the arrow C direction in FIG. 2, and is fed out in the arrow D direction in FIG. 3. That is, the insulation sleeve 8 moves in a direction to receive the lead wire 9 while rotating with respect to the lead wire 9. The first rotor 11 and the second rotor 12 each rotate at a speed of 600 rpm. The first rotor 11 and the second rotor 12 each have a roller curvature radius of 20 mm. Under the above conditions, the rotational speed of the insulation sleeve 8 is 950 rpm, and the linear speed of the insulation sleeve 8 is 275 mm/s. Thus, while the insulation sleeve 8 is inserted 100 mm, the first rotor 11 and the second rotor 12 rotate the insulation sleeve 8 fifty revolutions.

By so doing, the lead wire 9 is smoothly inserted into the hollow portion of the insulation sleeve 8. Then, as shown in FIG. 2, because the insulation sleeve 8 is advanced while being rotated, the two lengths of tape 6 and 7 are helically wound around the lead wire 9 while being inserted into the hollow portion of the insulation sleeve 8. When the insulation sleeve 8 inserts the lead wire 9 to a predetermined position, the air cylinder of the rotor actuator 17 is actuated, and the first rotor 11 and the second rotor 12 move away to the positions shown in FIG. 6. Thus, the lead wire 9 is fitted into the insulation sleeve 8 and then taken out.

As described in detail above, because the insulation sleeve assembling apparatus of the present embodiment includes an actuator unit that rotates the insulation sleeve 8 while actuating the lead wire 9 and the insulation sleeve 8 in a direction to approach each other, the two lengths of tape 6 and 7 wound around the lead wire 9 are involved in the insulation sleeve 8 to thereby make it possible to insert the lead wire 9 into the insulation sleeve 8 together with the lengths of tape 6 and 7. Thus, a process of peeling the lengths of tape 6 and 7 may be eliminated. In addition, the insulation sleeve assembling apparatus and the insulation sleeve assembling method include the actuator unit that uses the pair of center-recessed-cylinder-shaped first rotor 11 and second rotor 12 that are arranged so as to obliquely intersect with each other. Thus, when the insulation sleeve 8 is placed at a position at which the center-recessed-cylinder-shaped recessed portions intersect with each other, it is possible to apply rotational force and advancing force to the insulation sleeve 8 at the same time.

Here, the insulation sleeve 8 is made of woven fiber coated with resin in order to ensure electrical insulation even when the insulation sleeve 8 is rubbed. Thus, the insulation sleeve 8 has a certain rigidity. Hence, when the insulation sleeve is inserted in between the recessed portions of the pair of center-recessed-cylinder-shaped rotors, the outer peripheral surface of the insulation sleeve 8 closely contacts the outer peripheral surfaces of the rotors and, therefore, the insulation sleeve 8 can receive the force applied from the rotors. Then, because the insulation sleeve 8 rotates with a hollow shape while approaching the lead wire 9, the extended portions of the lengths of tape 6 and 7 wound around the lead wire 9 are involved with the rotating peripheral surface of the insulation sleeve 8 and then inserted into the hollow portion of the insulation sleeve 8.

Note that the aspects of the invention are not limited to the embodiment described above, part of the configuration may be modified appropriately without departing from the spirit of the invention. For example, in the present embodiment, the actuator unit employs the pair of center-recessed-cylinder-shaped rotors (the first rotor 11 and the second rotor 12) to generate rotational force and advancing force applied to the insulation sleeve 8 at the same time. Instead, the rotational force and the advancing force may be separately applied to the insulation sleeve 8. For example, it is applicable that the insulation sleeve 8 is held between a pair of elastic bodies (for example, a pair of rubber flat plates) and then the elastic bodies are moved in different directions to apply rotational force to the insulation sleeve 8, and then an overall apparatus that applies the rotational force to the insulation sleeve 8 is moved to approach the lead wire 9.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. An insulation sleeve assembling apparatus that assembles a tubular insulation sleeve to a lead wire formed of a plurality of conductors, comprising:
    a first rotor having center-recessed-cylinder-shaped portion;
    a second rotor having a center-recessed-cylinder-shaped portion;
    a first rotary motor connected to the first rotor via a first rotary shaft; and
    a second rotary motor connected to the second rotor via a second rotary shaft;
    wherein the first and second rotors intersect at the middle of the center-recessed-cylinder-shaped portions, with a tubular insulation sleeve disposed therebetween such that the first and second rotors are obliquely in contact with the insulation sleeve, and
    wherein the first and second motors rotate the first and second rotors such that a rotational force and an axial advancing force is applied to the insulation sleeve, thereby sliding the insulation sleeve over one or more lead wires.

2. The insulation sleeve assembling apparatus according to claim 1, wherein
    the respective rotors rotate in the same direction while being in contact with the insulation sleeve at the same angle to thereby apply both axial advancing force and rotational force to the insulation sleeve.

3. The insulation sleeve assembling apparatus according to claim 1, wherein
    an outer peripheral surface of a circular cross-sectional portion of at least one of the first and second rotors is arranged so as to be in contact with the insulation sleeve.

4. The insulation sleeve assembling apparatus according to claim 1, wherein the center-recessed-cylinder-shaped portions of the first and second rotors are arranged at opposite outer peripheral positions of the insulation sleeve while being in contact with the insulation sleeve.

5. The insulation sleeve assembling apparatus according to claim 4, wherein a distance between the first and second rotors at the point at which they contact the insulation sleeve is shorter than an outer diameter of the insulation sleeve.

6. The insulation sleeve assembling apparatus according to claim 4, wherein the first and second rotors rotate in the same direction.

7. The insulation sleeve assembling apparatus according to claim 4, wherein the first and second rotors rotate at the same speed.

* * * * *

UNITED STATES PATENT AND TRADEMARK OFFICE
CERTIFICATE OF CORRECTION

PATENT NO. : 7,900,345 B2
APPLICATION NO. : 12/390136
DATED : March 8, 2011
INVENTOR(S) : Yoshihiro Takahara et al.

It is certified that error appears in the above-identified patent and that said Letters Patent is hereby corrected as shown below:

| Column | Line | |
|---|---|---|
| 8 | 17 | After "having" insert --a--. |

Signed and Sealed this
Twentieth Day of September, 2011

David J. Kappos
*Director of the United States Patent and Trademark Office*